US006219958B1

(12) United States Patent
Eberts (10) Patent No.: US 6,219,958 B1
(45) Date of Patent: Apr. 24, 2001

(54) PRETIED LEADER LINE, HOOK AND LURE STORAGE DEVICE

(76) Inventor: Gerard P. Eberts, 3916 Ferran Dr., Metairie, LA (US) 70002-4418

( * ) Notice: Subject to any disclaimer, the term of this patent is extended or adjusted under 35 U.S.C. 154(b) by 0 days.

(21) Appl. No.: 08/795,551

(22) Filed: Feb. 6, 1997

(51) Int. Cl.$^7$ ................................................ A01K 97/06
(52) U.S. Cl. ............................................................ 43/57.2
(58) Field of Search ................................. 43/57.1, 57.2; 242/388.6

(56) References Cited

U.S. PATENT DOCUMENTS

| D. 335,216 | 5/1993 | Carlson . | |
|---|---|---|---|
| 2,595,463 | * 5/1952 | Kamps | 43/57.2 |
| 2,596,896 | * 5/1952 | Goad | 43/57.2 |
| 2,670,564 | 3/1954 | Keener . | |
| 2,716,302 | * 8/1955 | Dutton | 43/57.1 |
| 2,743,546 | 5/1956 | Crist | 43/54.5 |
| 2,744,353 | 5/1956 | Adams . | |
| 2,783,875 | 3/1957 | Shabarick . | |
| 2,789,389 | * 4/1957 | Moen | 43/57.2 |
| 2,804,717 | 9/1957 | Ripperdan . | |
| 2,813,368 | 11/1957 | Knowles . | |
| 2,879,619 | * 3/1959 | Peterson | 43/57.2 |
| 2,931,482 | * 4/1960 | Bishop | 197/175 |
| 3,213,564 | 10/1965 | Borell . | |
| 3,464,143 | 9/1969 | Scott . | |
| 3,890,737 | * 6/1975 | Jones | 43/57.2 |
| 4,036,451 | 7/1977 | Pipkin | 242/137.1 |
| 4,179,834 | * 12/1979 | Thomass | 43/57.2 |
| 4,281,806 | 8/1981 | McMullen | 242/125.1 |
| 4,290,223 | 9/1981 | Ostenberg et al. | 43/54.5 |
| 4,372,073 | 2/1983 | Goldman | 43/57.1 |
| 4,573,284 | 3/1986 | Hanson | 43/57.2 |
| 4,631,856 | 12/1986 | Born | 43/57.1 |
| 4,649,662 | 3/1987 | Tharp et al. | 43/43.14 |
| 4,791,752 | * 12/1988 | Van Kampen | 43/57.2 |
| 4,813,173 | 3/1989 | Abbotoy . | |
| 4,835,901 | * 6/1989 | Waldvogel | 43/57.1 |
| 4,862,635 | * 9/1989 | Conte | 43/57.1 |
| 4,920,683 | 5/1990 | Weber . | |
| 4,998,685 | 3/1991 | Spencer | 242/137 |
| 5,018,298 | * 5/1991 | Spears | 43/57.2 |
| 5,033,228 | 7/1991 | Gallivan | 43/54.1 |
| 5,386,662 | 2/1995 | Vader et al. | 43/57.2 |
| 5,438,791 | 8/1995 | Sherrod | 43/57.2 |
| 5,490,624 | 2/1996 | Yavitz | 225/34 |
| 5,544,442 | * 8/1996 | Perkins | 43/57.2 |
| 5,657,573 | * 8/1997 | Fischer et al. | 43/54.1 |

OTHER PUBLICATIONS

"Principles of Polymer Systems", Second Edition, by Ferdinand Rodriguez, copyright 1982, pp. 362–363, McGraw Hill Book Company.
Product Information Sheet Ethafoam 220, Brand Polyethylene Foam Plank, Form No. 172–01379–396, printed Mar. 1996, by Dow Chemical Co.
Material Safety Data Sheet, Product: Ethafoam (R) 200 Rounds Brand Polyethylene Plastic Foam, printed Mar. 11, 1994, pp. 1–8 by Dow Chemical Co.
Typical Properties of Unfabricated Ethafoam Brand Products, Form No. 172–01401–496 SMG, published Apr. 1996, by Dow Chemical Co.
Material Safety Data Sheet, by Nomaco, Inc., Product Name: Foam Plastics effective date Nov. 1, 1996, pp. 1/6–6/6, by Nomaco, Inc.
Spec Data, Product Name: HBR Backer Rod, printed May 1994, by Nomaco, Inc.

* cited by examiner

Primary Examiner—Kurt Rowan
(74) Attorney, Agent, or Firm—Raymond G. Areaux; Lisa Charouel (57) ABSTRACT

A leader line, hook and lure storage device comprising a unitary and homogenous geometrically shaped elastomeric spooling structure having formed therein a plurality of perimeter recesses each having located therein a peg which is anchored to the unitary and homogenous geometrically shaped elastomeric structure without a requirement for additional peg support. The anchoring provides the primary support for the peg.

23 Claims, 4 Drawing Sheets

PRETIED LEADER LINE, HOOK AND LURE STORAGE DEVICE

BACKGROUND OF THE INVENTION

1. Field of the Invention

The present invention relates to a fishing tackle storage device and, more particularly, to a pretied leader line, hook and lure storage device which is constructed from a very lightweight, resilient, buoyant and homogenous material wherein a pretied leader line may be tightly wound around a spooling chamber without stretching and fraying of the pretied leader line. Moreover, because the storage device is essentially made of such resilient material, the hook can be lodged at any place on the storage device thereby allowing the tight storage of leader lines without regard to their length. The resilient properties of the material allow for repeated lodging and dislodging of hooks into said material without materially compromising the integrity of the storage device. The storage device, thus, does not require, and in the preferred embodiment has no, discrete pre-positioned hook lodging/dislodging points or areas because the entire surface area of the storage device can serve the hook lodging/dislodging function. Henceforth, the unitary, homogenous structure of the storage device, with a plurality of pegs, made of such resilient material provides the triple functionality of (1) spooling a plurality of pretied leader lines, whereby the pretied leader lines are maintained separated and untangled, (2) storing the associated hooks anywhere in the surface of the storage device, and (3) requiring no other structural support means. The very lightweight, resilient, buoyant and homogenous material also allows the storage device to float (even when laden with hooks and lures) in the event the storage device is dropped overboard.

2. General Background

Fishermen typically pretie a plurality of leader lines with fishing tackle, such as hooks, lures and sinkers (including, without limitation, split shots) prior to a fishing expedition in order to save time. The pretied leader lines are made of nylon material or the like and often become entangled when grouped together (whether in a tackle box or in some other manner). Additionally, the tangling problem is more acute with dual or multi pretied leader lines (each having tied thereto two or more hooks and/or lure combinations) Untangling is both time consuming and sometimes futile; and, in the process, the hooks embedded in the lures can cause injury to the fisherman.

Several devices have been patented which are aimed at storage devices for pretied leaders, hooks and lures.

U.S. Pat. No. 2,596,896, by Goad, is directed to a storage device for pretied leader lines made of a light-weight, preferably round piece of wood, or a like moisture-retaining material having formed therein two lengthwise channels. The two lengthwise channels receive therein rubber bands wherein the rubber bands function to secure the leader lines in place. The invention, by Goad, is not made of a resilient material which allows the pretied leaders to be tightly wound around a spooling chamber and does not function to protect the leader line. Furthermore, the invention, by Goad, requires discrete pre-positioned hook lodging/dislodging points or areas.

U.S. Pat. No. 2,716,302, by Dutton, is directed to a storage device for pretied leader lines having a plurality of circumferential grooves and a slot in the bottom of each groove for anchoring the hook and pretied line. Therefore, the invention, by Dutton, provides discrete pre-positioned hook lodging/dislodging points or areas.

U.S. Pat. No. 2,743,546, by Crist, is directed to a pretied leader storage device made of a sponge-like material capable of receiving a hook. The groove design of the Crist invention does not fully protect the line of the pretied leader line and cannot store a lure. Moreover, pretied leader lines (typically made of nylon) cannot be adequately secured to the sponge-like material when the sponge-like material is squeezed together. The compressible properties of the sponge-like material renders the storage device cumbersome to use and deformable.

U.S. Pat. No. 2,789,389, by Moen, is directed to a pretied leader line storage device comprising a rigid central cylindrical tubular base having coupled thereto a resilient pad. The outer surface of the resilient pad has adhesively affixed thereto a leader retaining strip. The pretied leader line storage device, by Moen, is not made of only a single material, as is the present invention.

U.S. Pat. No. 4,791,752, by Van Kampen, is directed to a rotatably coupled pretied leader line storage device. The pretied leader line storage device comprises a spindle which is rotatably coupled to a boat or a tackle box and a foam tube having a longitudinal slit for coupling such foam tube around the spindle. The continuous grooves are not dimensioned to store a lure and the pegs used to hold leader lines are not anchored to the foamed material.

U.S. Pat. Nos. 4,036,451, by Pipkin, and 4,281,806, by McMullen, are directed to pretied leader line storage devices comprised of a reel made of mechanical components and a housing. However, the mechanical components of such storage devices are capable of malfunctioning. Moreover, such storage devices are cumbersome to use.

U.S. Pat. No. 4,573,284, by Hanson, is directed to a pretied leader and hook storage device which is made of a plurality of plastic type materials. The plastic type materials allow for floatation of the storage device. However, the storage device, by Hanson, is not made of a resilient material which allows the pretied leaders to be tightly wound around a spooling chamber. Moreover, the storage device, by Hanson, is complex in construction thereby increasing the cost of manufacturing.

U.S. Pat. No. 4,631,856, by Born, is directed to a pocket size holder for pretied leaders having a rubber pad for hooking a hook therein. The pocket size holder, by Born, is not made of a resilient material such that the pretied leader lines may be tightly wound and does not truly accommodate pretied leader lines of varying lengths since the rubber pad for storing the hooks are discrete pre-positioned hook lodging/dislodging points and areas. Additionally, the pocket size holder for pretied leaders, by Born, comprises a leader storage compartment, cutting blade, anchoring slots, and swivel securing means which increases the complexity of its construction.

U.S. Pat. No. 5,033,228, by Gallivan, is directed to a hollow tubular storage unit for pretied leader lines and hooks or the like having a plurality of spools rotatably mounted on an axle. The storage unit, by Gallivan, is complex in construction and is not made of a resilient material such that the pretied leader lines may be tightly wound. The invention, by Gallivan, provides a small projection on one of the side walls of the spooling chamber; hence, depending on the length of the leader line, the small projection may be upside down in order to secure the hook in the hook retainer (a discrete pre-positioned hook lodging/dislodging area). As a result, the leader line may become detached from the small projection and unwind.

U.S. Pat. No. 5,386,662, by Vader et al., is directed to a pretied leader line and hook storage device which is complex in construction. Additionally, the spooling chambers, by Vader et al., are not made of resilient material so that the pretied leader lines may be tightly wound around a spooling chamber. Since the anchoring means (a discrete pre-positioned hook lodging/dislodging area) for storing the hooks of the pretied leader lines are not in close proximity to the spooling chambers, the invention, by Vader et al., does not truly accommodate pretied leader lines of varying lengths.

U.S. Pat. No. 5,438,791, by Sherrod, is directed to a pocket size pretied leader line and hook storage device made of semi-stiff material. Although, the storage device, by Sherrod, is directed to preventing tangling of the pretied leader lines and storage of the hooks, the nylon leader lines cannot be tightly wound around the spooling chambers made of the semi-stiff material. Moreover, the hooks are stored in a discrete pre-positioned area; henceforth, the pretied leader lines are susceptible to becoming unwound and tangled. Additionally, the storage device, by Sherrod, cannot accommodate lure storage.

Other patents present in the art are U.S. Pat. Nos. 4,372,073, by Goldman, and 4,649,662, by Tharp et al., of which are directed to the use of polyethylene foamed material or the like; and U.S. Pat. Nos. 4,290,223, by Ostenberg et al., 4,998,685, by Spencer, and 5,490,624, by Yavitz, of which are directed to dispensing fishing and leader lines, but do not meet the needs of the storage device of the present invention.

Therefore, it can be seen that the known storage devices do not address the continuing need for a pretied leader line, hook and lure storage device which is constructed from a very lightweight, resilient, buoyant and homogenous material wherein a pretied leader line may be tightly wound around a spooling chamber without stretching and fraying of the pretied leader line and wherein the hooks can be lodged at any place on the storage device thereby allowing the tight storage of leader lines without regard to their length. The resilient properties of the homogenous material allow for repeated lodging and dislodging of hooks into said homogenous material without materially compromising the integrity of the storage device. The storage device, thus, does not require, and in the preferred embodiment has no, discrete pre-positioned hook lodging/dislodging points or areas because the entire surface area of the storage device can serve the hook lodging/dislodging function. Henceforth, the unitary, homogenous structure of the storage device, with a plurality of pegs, made of such resilient material provides the triple functionality of (1) spooling a plurality of pretied leader lines, whereby the pretied leader lines are maintained separated and untangled, (2) storing the associated hooks anywhere in the surface of the storage device, and (3) requiring no other structural support means. The very lightweight, resilient, buoyant and homogenous material also allows the storage device to float (even when laden with hooks and lures) in the event the storage device is dropped overboard.

SUMMARY OF THE PRESENT INVENTION

The preferred embodiment of the storage device of the present invention solves the aforementioned problems in a straight forward and simple manner. What is provided is a pretied leader line, hook and lure storage device which is constructed from a very lightweight, resilient, buoyant and homogenous material wherein a pretied leader line may be tightly wound around a spooling chamber without stretching and fraying of the pretied leader line. Moreover, because the storage device is essentially made of such resilient homogenous material, the hook can be lodged at any place on the storage device thereby allowing the tight storage of leader lines without regard to their length. The resilient properties of the homogenous material allow for repeated lodging and dislodging of hooks into said homogenous material without materially compromising the integrity of the storage device. The storage device, thus, does not require, and in the preferred embodiment has no, discrete pre-positioned hook lodging/dislodging points or areas because the entire surface area of the storage device can serve the hook lodging/dislodging function. Henceforth, the unitary, homogenous structure of the storage device, with a plurality of pegs, made of such resilient material provides the triple functionality of (1) spooling a plurality of pretied leader lines, whereby the pretied leader lines are maintained separated and untangled, (2) storing the associated hooks anywhere in the surface of the storage device, and (3) requiring no other structural support means. The very lightweight, resilient, buoyant and homogenous material also allows the storage device to float (even when laden with hooks and lures) in the event the storage device is dropped overboard.

The pretied leader line, hook and lure storage device comprises a unitary, elastomeric homogenous spooling structure and a plurality of pegs each of which is anchored in said homogenous spooling structure and wherein the pegs do not require any other support or anchoring means.

In view of the above, it is an object of the present invention to provide a pretied leader line, hook and lure storage device which maintains pretied leader lines separated and untangled and permits any selected hook or lure to be removed with its respective leader line without disturbing other pretied leader lines, hooks and lures.

A further object of the present invention is to provide a pretied leader line, hook and lure storage device having a plurality of spooling chambers each of which are dimensioned to accommodate pretied leader lines of varying lengths wherein a pretied leader line is shielded and protected within the confines of a respective spooling chamber. Moreover, the plurality of spooling chambers are dimensioned to accommodate and store at least one hook and/or lure and/or sinker coupled to a pretied leader line.

It is a further object of the present invention to provide such a pretied leader line, hook and lure storage device which stores hooks coupled to pretied leader lines thereby preventing a fisherman from injury.

It is a further object of the present invention to provide a pretied leader line, hook and lure storage device which is very simple to make, use and maintain.

It is a feature of a most preferred embodiment of the present invention to form the homogenous spool of the pretied leader line, hook and lure storage device of polyethylene foamed material having a closed cell structure. Such closed cell structure provides a sufficient amount of firmness (such firmness being attributable to its tendency to store energy reversibly) to the unitary, resilient, buoyant and homogenous spool such that such homogenous spool is not sponge-like and not significantly compressible. Moreover, such firmness provides for only slight compressibility properties needed to maintain the tight friction fit between a peg member and an aperture and to maintain the hooks lodged anywhere in the pretied leader line, hook and lure storage device. Moreover, such firmness provides sufficient stiffness for the device such that it is easier to use and does not require any other support structure even when laden with lures.

It is also a feature of the present invention to provide a pretied leader line, hook and lure storage device which is absent of mechanical components and streamline in construction thereby highly reliable because there are no mechanical parts and simple and inexpensive to manufacture.

A significant advantage of the present invention is that the device truly provides for storage of a plurality of variable length pretied leader lines without regard to their length.

It is also a feature of the invention that the storage device does not require discrete pre-positioned areas for lodging a hook.

An advantage of the present invention is that at least two or more hooks of a dual or multi pretied leader line may be lodged in the storage device at any respective point required to maintain a tight (and not a slack or loose) coil around the homogenous spool.

The above objects and other features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Referring now to the drawing, and in particular FIGS. 1–4, the pretied leader line, hook and lure storage device of the present invention is designated generally by the numeral 10. Pretied leader line, hook and lure storage device 10 is generally comprised of a unitary, resilient, buoyant and homogenous spool 20 having formed therein a plurality of spooling chambers 21a, 21b, 21c, 21d, 21e, 21f, 21g and 21h and a plurality of peg members 26a, 26b, 26c, 26d, 26e, 26f, 26g and 26h. In the exemplary embodiment, the unitary, resilient, buoyant and homogenous spool 20 is a cylindrical member, slightly less than 13 inches long, having formed therein eight spooling chambers wherein each chamber has a central spooling member 25 which is also cylindrical. However, any number of spooling chambers may be formed in the unitary, resilient, buoyant and homogenous spool 20. For example, a pretied leader line, hook and lure storage device 10 having a length slightly less than 10 inches can be conveniently stored in many tackle storage boxes. Nevertheless, pretied leader line, hook and lure storage device 10 may be any length that may be accommodated in a myriad of tackle storage boxes or tackle storage areas.

Furthermore, the length may be a function of the number of desired spooling chambers for separating the desired number of pretied leader lines and the dimensions of such spooling chambers.

The unitary, resilient, buoyant and homogenous spool 20, as well as the central spooling member 25, may be of any geometric or other shape (such as, a triangular or rectangular shaped member but not limited thereto) for forming therein the plurality of spooling chambers 21a, 21b, 21c, 21d, 21e, 21f, 21g and 21h and so long as the shape of such member allows for spooling.

Although, the unitary, resilient, buoyant and homogenous spool 20 has a plurality of spooling chambers 21a–21h in the preferred embodiment of the present invention, any geometric or other shaped member made of lightweight, resilient, buoyant and homogenous material which allows for spooling a plurality of pretied leader lines, without predefined spooling chambers, having a plurality of peg members spaced therealong may be substituted. The resilient properties allow spooling of the plurality of leader lines tightly, whereby a plurality of pretied leader lines may be maintained thereon separated and untangled, and storing of the associated hooks anywhere in the surface of the storage device 10. However, certain advantages (such as, but not limited to, (1) protection of the leader line with less opportunity for the line to snag other objects; and, (2) recessed peg members) are not available when the device lacks spooling chambers 21a–21h.

Since each of the plurality of spooling chambers 21a, 21b, 21c, 21d, 21e, 21f, 21g and 21h are identical, only one such spooling chamber 21a will be described in detail. Spooling chamber 21a comprises beginning wall 23, ending wall 24 and central spooling member 25 wherein the perimeter of beginning wall 23 and ending wall 24 are substantially equal. Beginning wall 23, ending wall 24, and central spooling member 25 are formed from a single (i.e., unitary) piece of the resilient homogenous elastomeric material. Central spooling member 25 is unitarily coupled to an inner surface of beginning wall 23 and ending wall 24 and has a perimeter smaller than the perimeter of beginning wall 23 and ending wall 24, thus forming a recess around the perimeter (hereinafter sometimes referred to as "perimeter recess"). Central spooling member 25 has formed therein aperture 22 for receiving therein peg member 26a wherein aperture 22 has a circumference slightly smaller than peg member 26a. The reversible energy storing properties of the unitary, resilient, buoyant and homogenous spool 20 allow peg member 26a to be secured in aperture 22 by compression to form a tight friction fit so that peg member 26a radially projects from central spooling member 25. While I prefer the radial or perpendicular orientation of the peg members 26a–26h, other angles or orientation could be used.

Nevertheless, a bonding and securing means, such as glue or the like, for further securing of peg member 26a may be preferred. Henceforth, peg member 26a is anchored in the material of the unitary, resilient, buoyant and homogenous spool 20 wherein the anchoring (either by friction fit and/or bonding) provides the primary means of supporting said peg without a requirement for additional peg member support.

Peg member 26a has a length such that a portion thereof is inserted in aperture 22 and the remaining portion, exterior of aperture 22, is not subject to significant tilting. Furthermore, preferably, such remaining portion does not extend beyond the outer boundary of beginning wall 23 or ending wall 24 and thus could be flush or below the outer perimeter of the homogenous spool 20. Maintaining the remaining portion flush or below the outer perimeter of the homogenous spool 20 protects peg members 26a–26h to prevent peg members 26a and 26b from dislodging and prevent displacement of the loop, swivel or slip knot formed in a pretied leader line which is slipped over such peg member. Furthermore installation of peg members 26a–26h flush or below the outer perimeter of the homogenous spool 20 decreases the opportunity for such peg members 26a–26h to be caught or snagged on objects in a tackle box, other tackle storage areas or while in use.

In the exemplary embodiment, peg member 26a is a hollow cylinder and made of a durable and firm plastic. Nevertheless, peg member 26a may be a solid cylinder and/or made of wood or the like.

Aperture 22 is formed in central spooling member 25 in close proximity of either of beginning wall 23 or ending wall 24 such that a sufficient amount of width exists on central spooling member 25 for winding a pretied leader line adjacent peg member 26a. Moreover, placing peg member 26a on central spooling member 25 enables at least one hook and lure combination coupled to a pretied leader line to be placed anywhere along the surface area of beginning wall 23 and ending wall 24. Peg member 26a provides a holding means for a loop, swivel or other fishing tackle mechanism tied in a pretied leader line or a slip knot formed in a pretied leader line.

Beginning wall 23 and ending wall 24 provide storage space for lodging at least one hook and lure combination to a respective spooling chamber. Additionally, two or more hook and/or lure combinations coupled to a dual or multi pretied leader line may be lodged in beginning wall 23 or end wall 24 in a secured and convenient manner. Nevertheless, central spooling member 25, after a pretied leader line has been wound therearound, can support at least one hook and/or lure combination provided adequate space is available. By hooking the lures in central spooling member 25, the pretied leader line is further shielded and protected. There exists no need for, and the preferred embodiment has no, discrete pre-positioned areas or points for lodging/dislodging a hook and/or lure combination. Henceforth, pretied leader lines of varying lengths without regard to their lengths may be fixedly secured to the pretied leader line, hook and lure storage device 10 of the present invention.

Each of the plurality of spooling chambers 21a, 21b, 21c, 21d, 21e, 21f, 21g and 21h are preferably equally spaced along the radial axis of the unitary, resilient, buoyant and homogenous spool 20 wherein ending wall 24 of a spooling chamber is the beginning wall of a succeeding spooling chamber. In the exemplary embodiment, beginning wall 23, ending wall 24 and central spooling member 25 have the same width so as to simplify the manufacturing and use of the present invention. In the exemplary embodiment, said width is ¾ of an inch, but certainly not limited thereto. Nevertheless, central spooling member 25 need not have the same width as beginning wall 23 and ending wall 24. In the preferred embodiment, the width of beginning wall 23 and ending wall 24 should be such that a hook may be lodged in beginning wall 23 or ending wall 24 of a spooling chamber. Moreover, the width of beginning wall 23 and ending wall 24 may be dimensioned to accommodate the width of a lure such that when a hook of such a lure is lodged into beginning wall 23 or ending wall 24, the lure does not interfere with the winding of a pretied leader line in an adjacent spooling chamber.

The width and perimeter of central spooling member 25 are dimensioned to accommodate pretied leader lines of varying lengths such that the pretied leader lines are shielded and protected between beginning wall 23 and ending wall 24 whereby said perimeter recess is formed. Thus, each of the plurality of pretied leader lines within said perimeter recess is less susceptible to being snagged, frayed or damaged by extraneous objects. Furthermore, the width and perimeter of central spooling member 25 may be dimensioned such that said perimeter recess between beginning wall 23 and ending wall 24 is capable of accommodating one or more lures and/or sinkers (including, without limitation, split shots). Henceforth, when a hook of a lure is lodged in the inner surface of either of beginning wall 23 or ending wall 24 or in central spooling member 25, the lure may be strategically placed within said perimeter recess.

The unitary, resilient, buoyant and homogenous spool 20 is made of a lightweight, foamed elastomeric floatation material preferably having a closed cell structure with an average density in the range of 2.0–2.4 pounds per cubic foot (pcf), such as polyethylene foamed plastic manufactured by NOMACO or ETHAFOAM brand polyethylene foam manufactured by The DOW Chemical Co. The term "homogenous spool" is defined as a spooling structure made of a single material. The term "unitary" is defined as no other parts or components. In the preferred embodiments, ETHAFOAM 220 having a closed cell structure with an average density of 2.3 pcf, manufactured by The Dow Chemical Co., was used or NOMACO HBR having a closed cell structure with a nominal density of 2.0 pcf was used. Nevertheless, foamed elastomeric floatation material having a closed cell structure with an average density from 1.5 to 9.5 pcf are commercially available and I predict could be used for pretied leader line, hook and lure storage device 10. Product literature in Product Information Sheet ETHAFOAM 220, Brand Polyethylene Foam Plank, Form No. 172-01379-396, printed March 1996 and Material Safety Data Sheet, Product: ETHAFOAM (R) 200 ROUNDS BRAND POLYETHYLENE PLASTIC FOAM, printed Mar. 11, 1994, pages 1–8 and Typical Properties of Unfabricated ETHAFOAM BRAND PRODUCTS, Form No. 172-01401-496 SMG, published April 1996, all of which are by DOW Chemical Company are incorporated herein by reference as if set forth below in full. Additionally, Material Safety Data Sheet, by NOMACO, Inc., Product Name: Foam Plastics, effective date Nov. 1, 1996, pages 1/6–6/6 and SPEC DATA, Product Name: HBR Backer Rod, printed May 1994, by NOMACO, Inc., both are incorporated herein by reference as if set forth below in full.

Also, a single elastomeric material, which is a mixture of closed cells and open cells, could serve as the resilient, buoyant, and homogenous elastomeric material for the storage device 10, but would generally exhibit less firmness and less buoyancy and might not allow for adequate peg anchoring by mere friction fit. Therefore "homogenous spool" is also defined as a single elastomeric material which is a mixture of closed cells and open cells.

The foamed elastomeric floatation material having a closed cell structure provides a sufficient amount of firmness (such firmness being attributable to its tendency to store energy reversibly) to the unitary, resilient, buoyant and homogenous spool 20 such that such homogenous spool 20 is not sponge-like and not significantly compressible. Furthermore, no other support structure is needed to make or use the pretied leader line, hook and lure storage device 10.

Polyethylene foamed plastic having a closed cell structure is highly buoyant thereby rendering the present invention floatable, even when laden with lures, hooks and sinkers. Additionally, polyethylene foamed plastic is highly pliable and resilient whereby as the pretied leader line is tightly wound around central spooling member 25 of one of the plurality of spooling chambers 21a–21h, the pretied leader line is not stretched or frayed while maintaining a tight fit around central spooling member 25. The resilient properties of polyethylene foamed plastic facilitates the triple functionality of (1) spooling a plurality of pretied leader lines, whereby the pretied leader lines are maintained separated and untangled, (2) storing the associated hooks anywhere in the surface of the storage device 10, and (3) requiring no other structural support means. Polyethylene foamed plastic is also advantageous for receiving therein hooks wherein polyethylene foamed plastic does not materially break away, tear, crack or crumble as hooks are repeatedly lodged into the foamed plastic and dislodged therefrom. Moreover, the reversible energy storing properties provide for only slight compressibility properties needed to maintain the tight friction fit between peg member 26a and aperture 22 and to maintain the hooks lodged anywhere in pretied leader line, hook and lure storage device 10. From the foregoing, the integrity of the resilient, buoyant and homogenous material is not materially compromised; therefore, the useful life of the present invention is extended.

The following description refers to spooling and unspooling of a pretied leader line using pretied leader line, hook and lure storage device 10 of the present invention.

After the desired fishing line has been cut and assembled into a pretied leader line having a hook and/or lure and/or sinker coupled thereto, the loop, slip knot, swivel or fishing tackle mechanism is positioned onto one of the plurality of peg members 26a–26h. The fisherman proceeds to tightly wound, manually, the pretied leader line around central spooling member 25 until the hook can be lodged anywhere in the surface area of the spooling chamber wherein the tight winding is maintained. When spooling dual or multi pretied leader lines, the dual or multi lines thereof are maintained together during winding until the shortest of such lines is coiled and the hook for such shortest line is lodged on the storage device 10 at a point intended to maintain a tight coil. Thereafter, spooling of the remaining lines, of the multi pretied leader line, continues until the next shortest line is completely coiled and its respective hook lodged in the surface of the storage device 10. This process continues until all lines are completely spooled or coiled.

In order to unspool the tightly wound pretied leader line or dual or multi pretied leader lines, the fisherman dislodges the hook or hooks and proceeds to completely unwind the pretied leader line. For example, the fisherman may place his hands on each distal end of the storage device 10 and continuously turn homogenous spool 20 until the pretied leader line has been unspooled. Alternately, while holding the pretied leader line, homogenous spool 20 may be dropped and maneuvered until the pretied leader line is completely unspooled. Thereafter, the loop, slip knot, swivel or clasping mechanism is removed from the peg member. In order to avoid tangling while unspooling, the last hook lodged, of a dual or multi pretied leader line, should be the first hook dislodged, and so on and so forth successively with each other hook.

Figure 1:
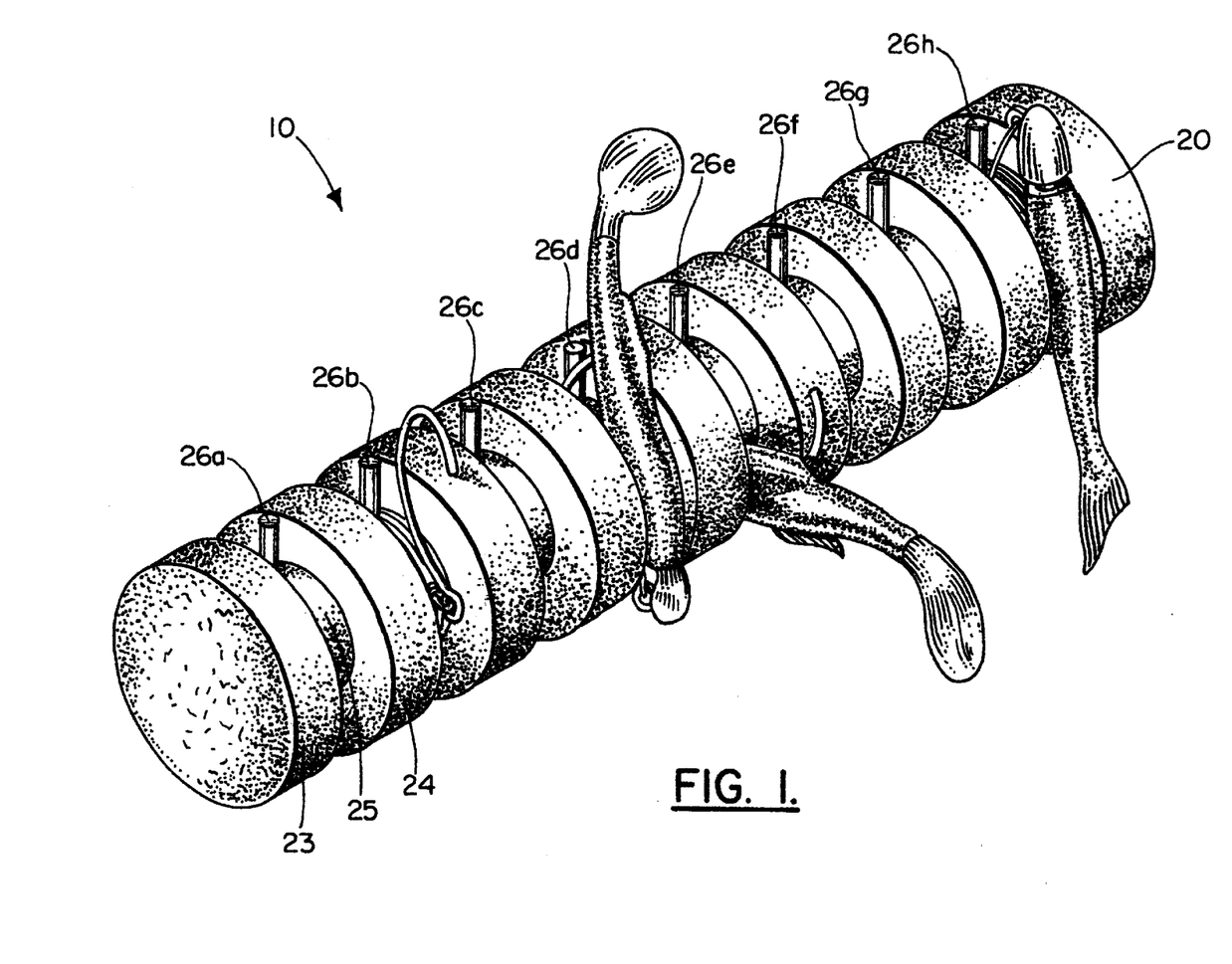
FIG. 1 is a perspective view of the pretied leader line, hook and lure storage device of the present invention.
Figure 2:
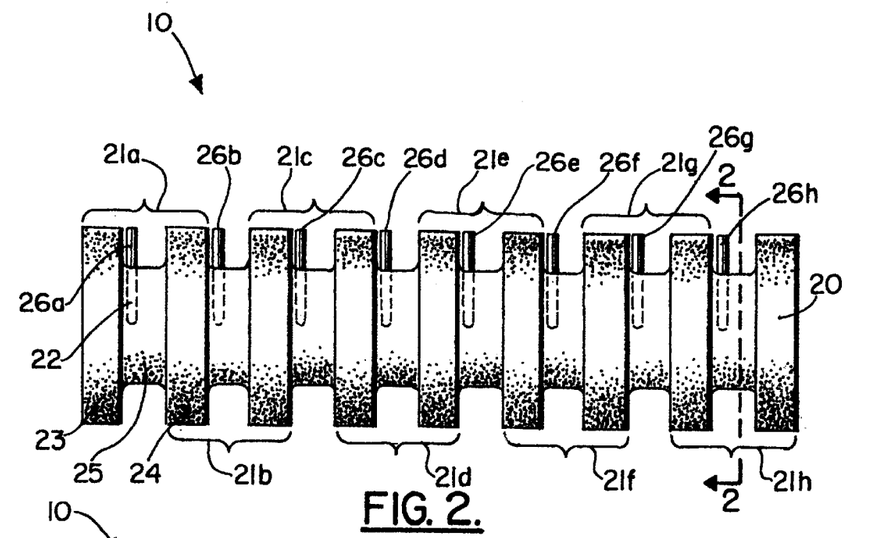
FIG. 2 is a side view of the pretied leader line, hook and lure storage device of the embodiment of FIG. 1.
Figure 3:
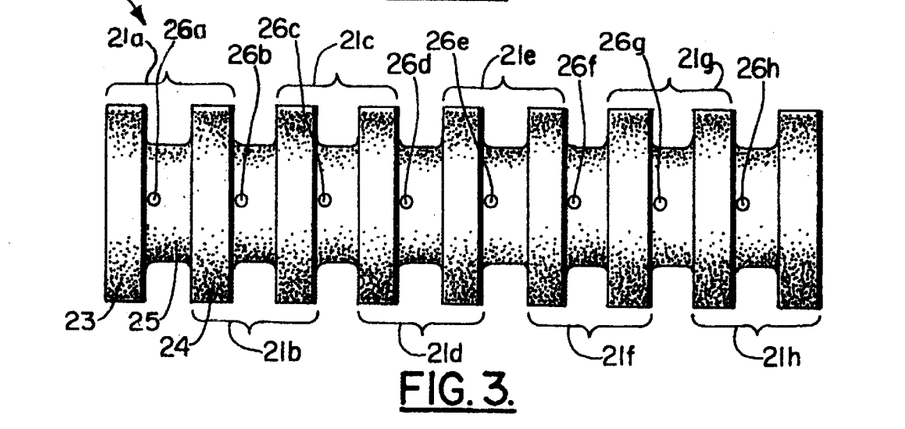
FIG. 3 is a top view of the pretied leader line, hook and lure storage device of the embodiment of is FIG. 1.
Figure 4:
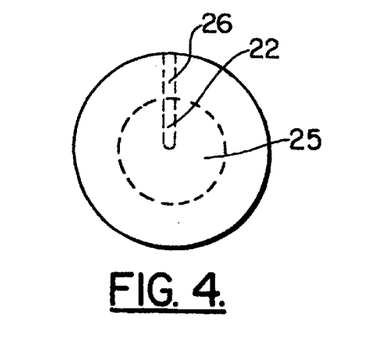
FIG. 4 is a cross-sectional view along the plane 2–2 of the pretied leader line, hook and lure storage device of the of the embodiment of FIG. 2.
Figure 5A:
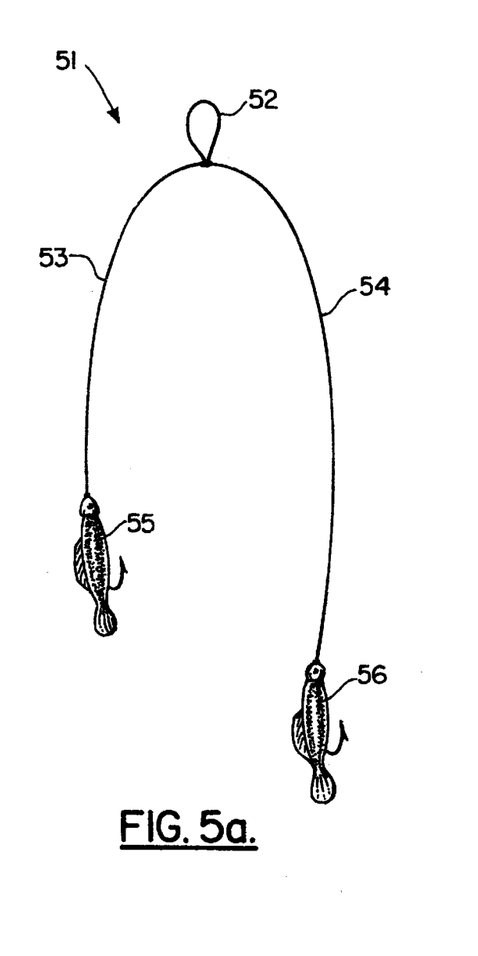
FIG. 5a is a view of a different length dual pretied leader line.
Figure 5B:
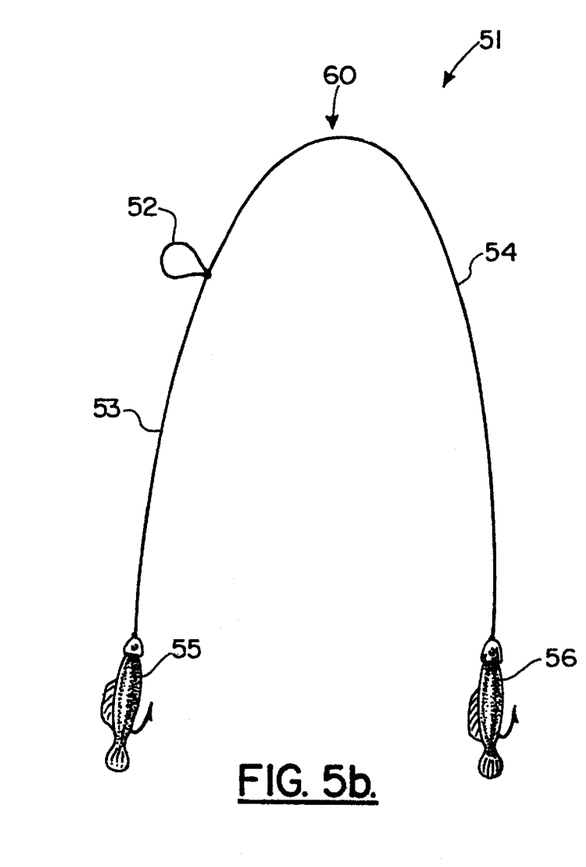
FIG. 5b is a view of a different length dual pretied leader line formed in a loop having a center point
Figure 5C:
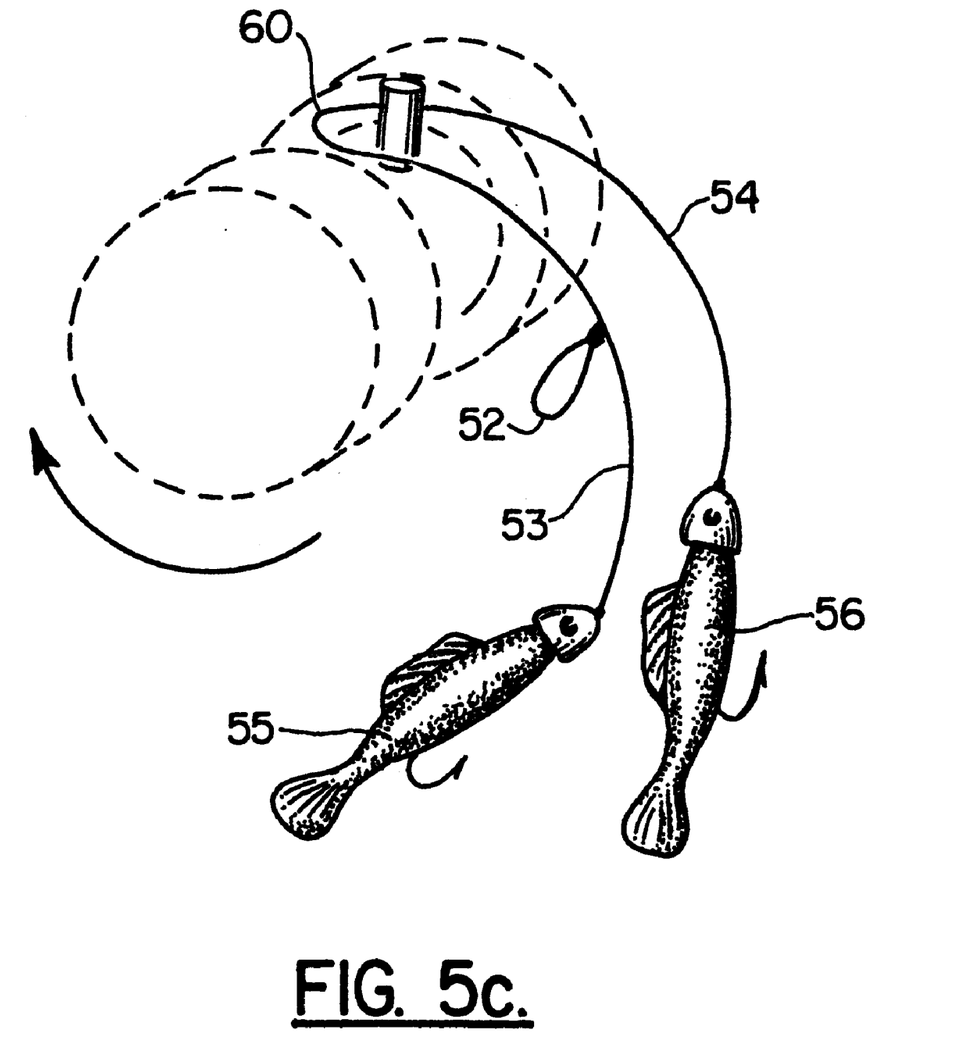
FIG. 5c is a view of a different length dual pretied leader line slipped on a peg member.

For dual pretied leader lines of different lengths, a more preferred coiling procedure is described immediately hereinafter. Referring now to FIGS. 5a, 5b and 5c, the dual pretied leader line 51 is comprised of a short leader 53, with a lure 55 attached thereto, and a long leader 54, with a lure 56 attached thereto, divided by a loop or swivel 52. To coil the pretied leader line 51, the fisherman (rather than positioning loop or swivel 52 on one of the plurality of peg members 26a–26h) balances pretied leader line 51 to form a loop with a center point 60. Thereafter, the loop having center point 60 is positioned onto one of the plurality of peg members 26a–26h at center point 60 and the fisherman, holding lures 55 and 56 together, proceeds to coil the pretied leader line 51 in the spooling chamber associated with said peg. Upon completion of coiling, the hooks of lures 55 and 56 are lodged anywhere in said spooling chamber. For different length dual pretied leader lines, uncoiling is made much easier when this coiling procedure is used.

Pretied leader line, hook and lure storage device 10 is simple and inexpensive to manufacture. The manufacturing of the pretied leader line, hook and lure storage device requires cutting a unitary, resilient, buoyant and homogenous spool to the desired length and simultaneously routing the desired number of the plurality of spooling chambers with a conventional routing means. Apertures 22 are then formed in each of the central spooling members 25 using a drilling or punching means. Thereafter, each of the plurality of pegs 26a–26h is inserted into their respective apertures 22 and anchored in central spooling member 25 due to the tight friction fit. Glue may be used, and may be preferred, to further anchor said pegs 26a and 26h.

Nevertheless, the manufacturing of the pretied leader line, hook and lure storage device 10 may be performed by molding a unitary, resilient, buoyant and homogenous material with a plurality of spooling chambers 21a, 21b, 21c, 21d, 21e, 21f, 21g and 21h and each of their respective apertures 22. Thereafter, each of the plurality of pegs 26a–26h is inserted into their respective apertures 22 and anchored in central spooling member 25 due to the tight friction fit. Glue may be used, and may be preferred, to further anchor said pegs 26a and 26h.

In the preferred embodiment, pretied leader line, hook and lure storage device 10 has a length of slightly less than 10 inches and has a total of six spooling chambers. Beginning wall 23 and ending wall 24 have a width of ¾ of an inch and a diameter of approximately 2 inches and central spooling member 25 has a width of ¾ of an inch and a perimeter recess depth of ½ of an inch. It can be appreciated that pretied leader line, hook and lure storage device 10 will accommodate hooks in the range of a #1 to a #8 and ⅒ to ⅝.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A pretied leader line, hook and lure storage device comprising:

a unitary, homogenous elastomeric spooling structure which is solid in cross-section and cylindrically shaped and having formed therein a recess around a perimeter thereof, and, a peg located in said recess and anchored in said unitary, homogenous, elastomeric spooling structure wherein the anchoring provides the primary means of supporting said peg, wherein said unitary, homogenous, elastomeric spooling structure is made of a lightweight, foamed elastomeric floatation material, wherein said lightweight foamed elastomeric floatation material is polyethylene foamed plastic comprising a closed cell structure.

2. The device of claim 1, wherein said recess is defined by a beginning wall, an ending wall and a central spooling member between said beginning wall and said ending wall wherein said central spooling member has formed therein an aperture for anchoring therein said peg and wherein said peg projects from said central spooling member.

3. The device of claim 2, wherein the perimeter of said beginning wall and said ending wall are substantially equal; and said central spooling member has a perimeter smaller than the perimeter of said beginning wall and said ending wall.

4. The device of claim 2, wherein the width of said beginning wall, said ending wall and said central spooling member are equal.

5. The device of claim 2, wherein the width of said beginning wall and said ending wall are equal.

6. The device of claim 1, wherein said polyethylene foamed plastic has an average density in the range of 1.5 to 9.5 pounds per cubic foot.

7. The device of claim 1, wherein said polyethylene foamed plastic has an average density in the range of 2.0–2.4 pounds per cubic foot.

8. A leader line, hook and lure storage device comprising:

A unitary and homogenous geometrically shaped elastomeric spooling structure which is solid in cross-section and cylindrically shaped and having formed therein a plurality of perimeter recesses each having located therein a peg which is anchored to said unitary and homogenous geometrically shaped elastomeric spooling structure without a requirement for additional peg support, wherein said unitary homogenous, elastomeric spooling structure is made of a lightweight, foamed elastomeric floatation, wherein said lightweight, foamed elastomeric floatation material is polyethylene foamed plastic comprising a closed-cell structure.

9. The device of claim 8, wherein each perimeter recess of said plurality of recesses is defined by a beginning wall, an ending wall and a central spooling member between said beginning wall and said ending wall wherein said central spooling member has formed therein an aperture for anchoring therein said peg and wherein said peg projects from said central spooling member.

10. The device of claim 9, wherein the perimeter of said beginning wall and said ending wall are substantially; and said central spooling member has a perimeter wall smaller than the perimeter of said beginning wall and said ending wall.

11. The device of claim 9, wherein the width of said beginning wall, said ending wall and said central spooling member are equal.

12. The device of claim 9, wherein the width of said beginning wall and said ending wall are equal.

13. A leader line, hook and lure storage device comprising:

a unitary and homogenous geometrically shaped elastomeric spooling means which is solid in cross-section and cylindrically shaped, with an outer perimeter having formed therein a plurality of spaced apertures, for spooling a plurality of pretied leader lines and storing hooks coupled to said plurality of pretied leader lines anywhere in said outer perimeter wherein said unitary and homogenous shaped elastomeric spooling means requires no other means for structural support and, a plurality of holding means each of which is anchored to a respective one of said plurality of apertures, and wherein said unitary and homogenous geometrically shaped elastomeric spooling means is made of a lightweight, foamed elastomeric floatation material, and wherein said lightweight, foamed elastomeric floatation material consists of polyethylene closed-cell foamed plastic.

14. The device of claim 13, wherein said unitary and homogenous geometrically shaped elastomeric spooling means has formed therein a plurality of means for spooling.

15. The device of claim 14, wherein each spooling means comprises:

a beginning wall;

an ending wall; and, a central spooling member between said beginning wall and said ending wall, and wherein the ending wall of a spooling means is the beginning wall of a succeeding spooling means.

16. The device of claim 15, wherein said central spooling member has formed therein one of said plurality of apertures.

17. The device claim 15, wherein the perimeter of said beginning wall and said ending wall are substantially equal; and said central spooling member has a perimeter smaller than the perimeter of said beginning wall and said ending wall.

18. The device of claim 15, wherein the width of said beginning wall, said ending wall and said central spooling member are equal.

19. The device of claim 15, wherein the width of said beginning wall and said ending wall are equal.

20. The device of claim 13, wherein said respective one of said plurality of holding means projects from said central spooling member.

21. The device of claim 13, wherein said unitary and homogenous geometrically shaped elastomeric spooling means has formed therein a means for spooling.

22. A leader line, hook and lure storage device comprising:

a unitary and homogenous geometrically shaped elastomeric structure which is solid in cross-section and cylindrically shaped having formed therein a plurality of means for spooling wherein said unitary and homogenous geometrically shaped elastomeric structure is void of any discrete pre-positioned hook lodging/dislodging structure; and a plurality of holding means each of which is friction fit coupled to respective one of said plurality of spooling means, and wherein said unitary and homogenous geometrically shaped elastomeric structure is made of a lightweight, foamed elastomeric floatation material, and wherein said lightweight, foamed elastomeric floatation material consists of polyethylene closed-cell foamed plastic.

23. The device of claim 22, wherein each spooling means comprises:

a beginning wall;

an ending wall; and a central member between said beginning wall and said ending wall, and wherein the ending wall of a spooling means is the beginning wall of a succeeding spooling means.

* * * * *